(12) United States Patent
Pan et al.

(10) Patent No.: US 12,289,529 B2
(45) Date of Patent: Apr. 29, 2025

(54) IMAGE CAPTURE DEVICE

(71) Applicant: PRIMAX ELECTRONICS LTD., Taipei (TW)

(72) Inventors: Yung-Tai Pan, Taipei (TW); Chun-Chieh Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 146 days.

(21) Appl. No.: 18/454,827

(22) Filed: Aug. 24, 2023

(65) Prior Publication Data

US 2025/0039547 A1    Jan. 30, 2025

(30) Foreign Application Priority Data

Jul. 25, 2023   (TW) .................................. 112127809

(51) Int. Cl.
*H04N 23/695* (2023.01)

(52) U.S. Cl.
CPC ................................. *H04N 23/695* (2023.01)

(58) Field of Classification Search
CPC .... H04N 23/69; H04N 23/695; H04N 23/698; H04N 23/60; H04N 2201/3254; H04N 2201/3252
USPC ......................................................... 348/335
See application file for complete search history.

(56) References Cited

U.S. PATENT DOCUMENTS

| | | | |
|---|---|---|---|
| 10,356,330 B1 * | 7/2019 | Morton ................... | H04N 23/54 |
| 11,070,712 B2 * | 7/2021 | Li .......................... | H04N 23/661 |
| 11,563,882 B2 * | 1/2023 | Li .......................... | H04N 23/69 |
| 11,683,589 B2 * | 6/2023 | Kariotoglou ......... | H04N 23/695 |
| | | | 348/187 |
| 11,815,793 B2 * | 11/2023 | Obana ..................... | H04N 23/51 |
| 11,849,206 B1 * | 12/2023 | Aygunduz ................ | G06T 7/50 |
| 12,114,054 B2 * | 10/2024 | Ninomiya ............ | G03B 17/561 |
| 2004/0100563 A1 * | 5/2004 | Sablak ................. | H04N 23/611 |
| | | | 348/E7.087 |
| 2009/0039734 A1 * | 2/2009 | Takahashi .............. | H02N 2/103 |
| | | | 348/208.7 |
| 2011/0268433 A1 * | 11/2011 | Yim ....................... | H04N 7/185 |
| | | | 396/428 |
| 2019/0364642 A1 * | 11/2019 | Feeney ............... | G06F 3/04812 |
| 2021/0067681 A1 * | 3/2021 | Li ......................... | H04N 23/631 |
| 2021/0258493 A1 * | 8/2021 | Kariotoglou ............ | G06T 7/80 |
| 2022/0014669 A1 * | 1/2022 | Li ........................... | H04N 23/69 |
| 2022/0100060 A1 * | 3/2022 | Obana .................. | G03B 17/561 |

(Continued)

*Primary Examiner* — Pritham D Prabhakher
(74) *Attorney, Agent, or Firm* — WPAT, PC

(57) ABSTRACT

An image capture device includes a casing, a camera module, a rotatable member, and a pan-tilt module. The casing includes front and rear casings. The camera module is disposed in the casing. A portion of the camera module is through an opening region of the front casing. The camera module includes a lens module bracket and a lens module disposed therein. The rotatable member is fixed on the lens module bracket. The rotatable member is configured to rotate the camera module when the rotatable member is rotated relative to the casing, so that the lens module is switched between horizontal and vertical shooting modes. The pan-tilt module includes a motor bracket, first and second motors. The first motor is connected between one end of the motor bracket and a sidewall of the casing. The second motor is connected to another end of the motor bracket.

10 Claims, 5 Drawing Sheets

(56) References Cited

U.S. PATENT DOCUMENTS

2022/0329738 A1* 10/2022 Abe ................... H04N 23/695
2023/0247270 A1*  8/2023 Ninomiya .............. G03B 30/00
2023/0362472 A1* 11/2023 Wakamatsu ......... H04N 23/687

* cited by examiner

IMAGE CAPTURE DEVICE

FIELD OF THE INVENTION

The present disclosure relates to an image capture device.

BACKGROUND OF THE INVENTION

For a traditional fixed image capture device, if it is necessary to switch from a vertical shooting mode to a horizontal shooting mode, or from a horizontal shooting mode to a vertical shooting mode, a user needs to take off the mounted device and then rotate it, and then mount the device again, but the process of switching between the vertical shooting mode and the horizontal shooting mode is inconvenient for the user. It is also inconvenient if the user needs to adjust a lens angle of the traditional fixed image capture device for adjusting an image capturing position at any time.

SUMMARY OF THE INVENTION

The present disclosure provides an image capture device, which includes a casing, a camera module, a rotatable member, and a pan-tilt module. The casing includes a front casing and a rear casing, and the front casing has an opening region. The camera module is disposed in the casing, and a portion of the camera module is through the opening region of the front casing. The camera module includes a lens module bracket and a lens module disposed in the lens module bracket. The rotatable member is fixed on the lens module bracket, and the rotatable member is configured to rotate the camera module when the rotatable member is rotated relative to the casing, so that the lens module is switched between a horizontal shooting mode and a vertical shooting mode. The pan-tilt module includes a motor bracket, a first motor and a second motor. The first motor is connected between one end of the motor bracket and a sidewall of the casing, and the second motor is connected to another end of the motor bracket.

In some embodiments of the present disclosure, the pan-tilt module further includes: a counterweight, adjacent to an inner surface of the rear casing.

In some embodiments of the present disclosure, the image capture device further includes a time of flight (TOF) module, including: a first flexible circuit board, in which a portion of the first flexible circuit board is fixed on the lens module bracket, and another portion of the first flexible circuit board is through the lens module bracket; and a TOF sensor, disposed on the portion of the first flexible circuit board.

In some embodiments of the present disclosure, the TOF module further includes: an optical filter, adjacent to the TOF sensor, in which the rotatable member has an opening, and the optical filter is disposed in the opening.

In some embodiments of the present disclosure, the TOF sensor has a sensing array disposed in a non-circular and non-regular polygonal region.

In some embodiments of the present disclosure, the image capture device further includes an adapter module, including: an adapter plate, disposed in the casing and close to a back side of the lens module, in which the first flexible circuit board is connected to the adapter plate; and a wire, in which one end of the wire is connected to a back side of the adapter plate, and the first flexible circuit board is electrically connected to the wire through the adapter plate.

In some embodiments of the present disclosure, the lens module further includes: a second flexible circuit board, connected to the adapter plate, in which the wire is electrically connected to the second flexible circuit board through the adapter plate.

In some embodiments of the present disclosure, the image capture device further includes a heat sink, disposed between the second flexible circuit board and the adapter plate.

In some embodiments of the present disclosure, the adapter module further includes: a wire support, adjacent to the back side of the adapter plate, and the wire support having a central opening, in which the wire is through the central opening.

In some embodiments of the present disclosure, the wire support further has a strip-shaped opening connected to the central opening.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
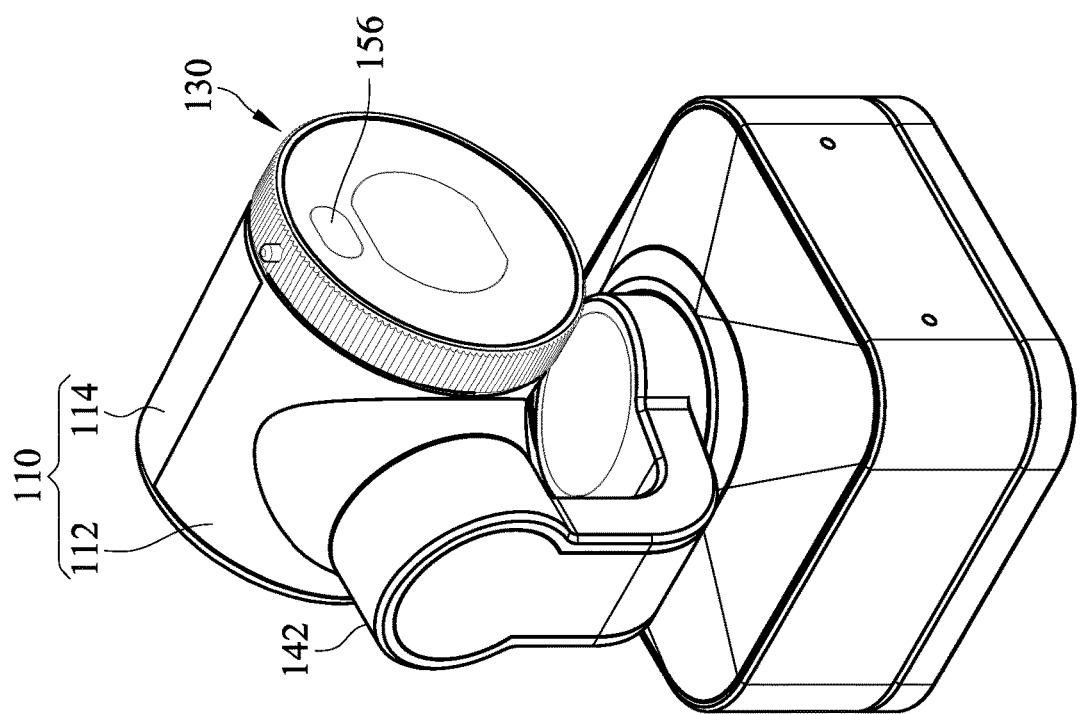
FIG. 1 is a perspective view of an image capture device according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, for the traditional fixed image capture device, it is inconvenient if the user needs to switch between the vertical shooting mode and the horizontal shooting mode and to adjust the lens angle at any time. Therefore, the present invention provides an image capture device, which includes a casing, a camera module, a rotatable member, and a pan-tilt module, in which the rotatable member allows the user to easily switch between the vertical and horizontal shooting modes, and the pan-tilt module can adjust a lens module of the camera module to a suitable angle. In some embodiments, the image capture device further includes a time of flight (TOF) module, which can quickly sense a distance of a subject and feed it back to the lens module, so that the lens module can focus quickly. As such, the user's operational burden can be greatly reduced. Various embodiments of the image capture device of the present invention will be described in detail below.

Figure 2:
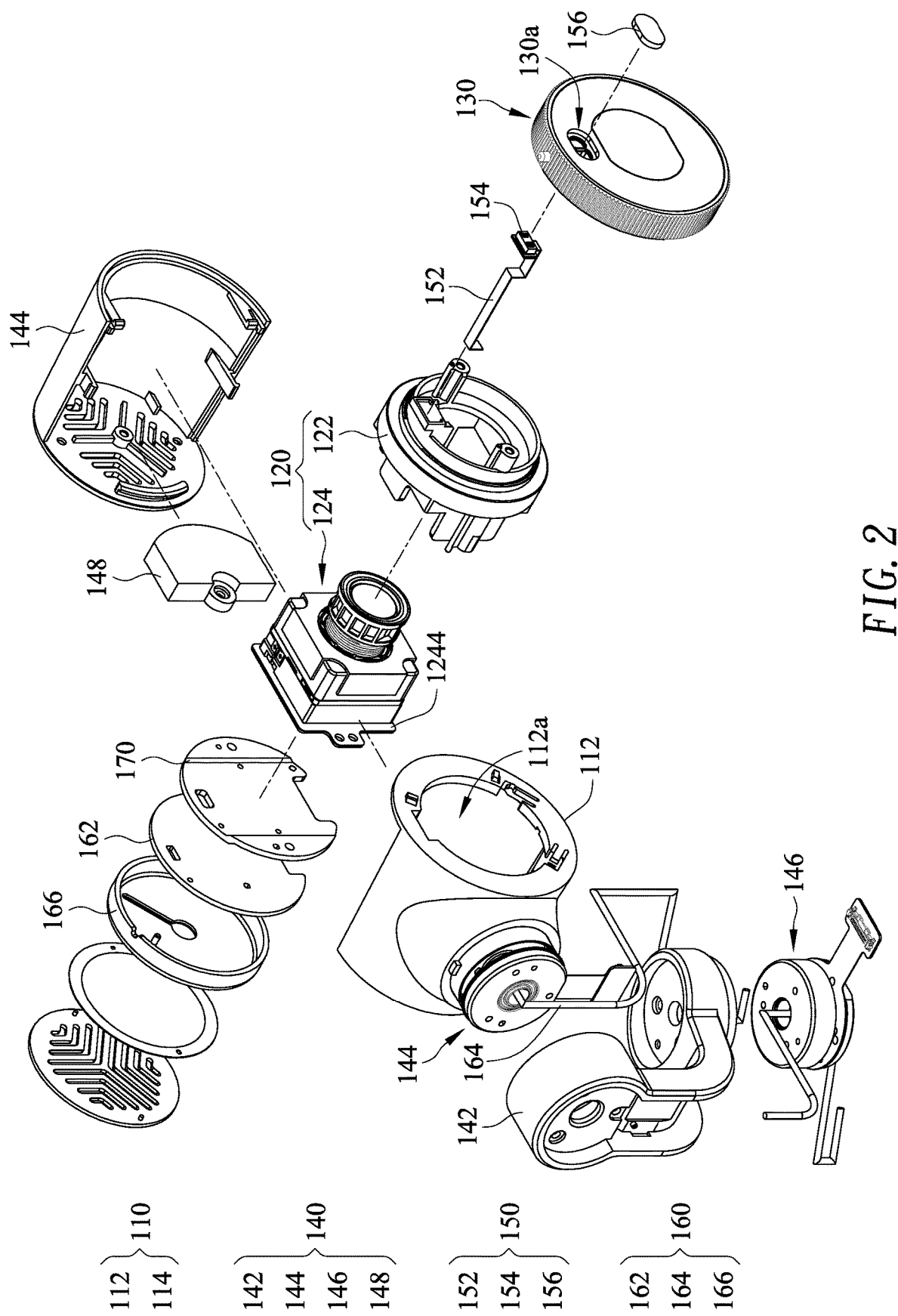
FIG. 2 is an exploded perspective view of an image capture device according to an embodiment of the present invention.
Figure 3:
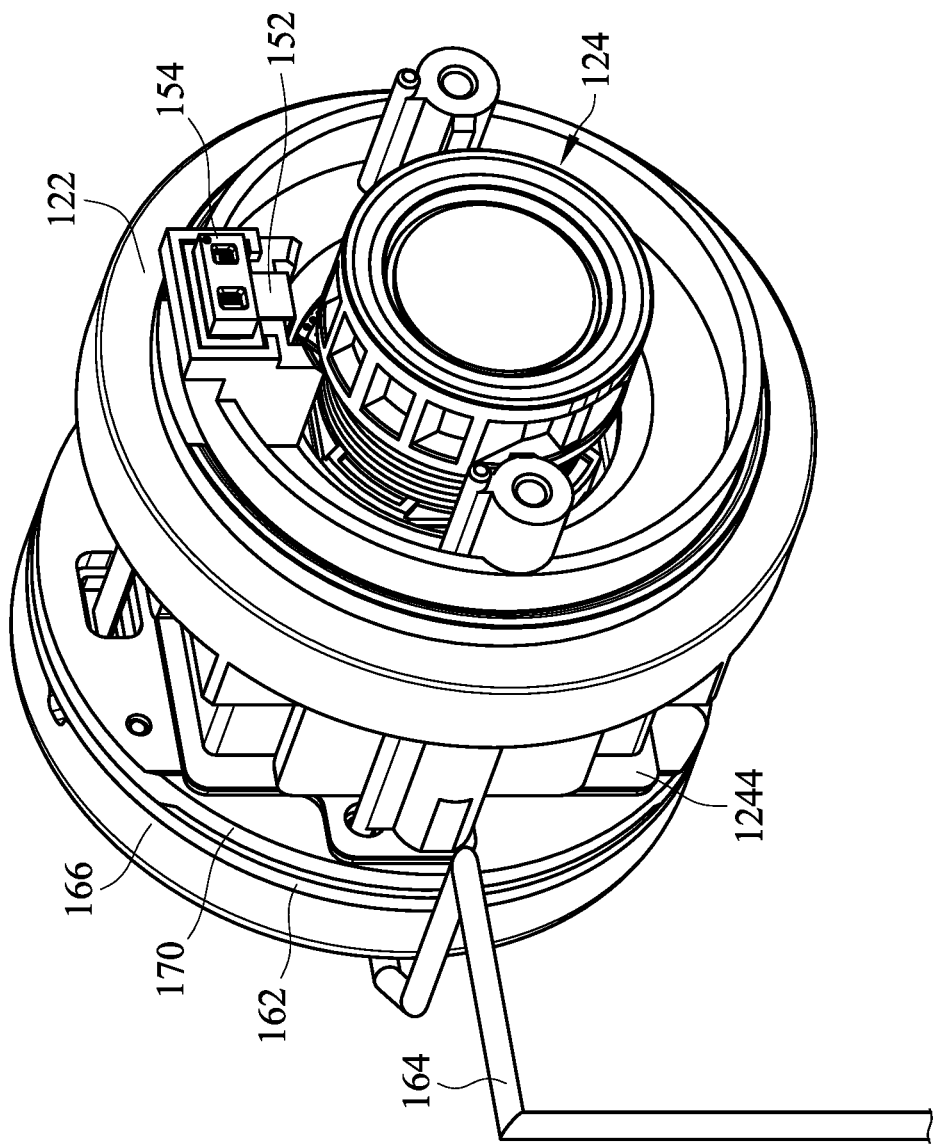
FIG. 3 is a perspective view of a portion of an image capture device at a viewing angle according to an embodiment of the present invention.
Figure 4:
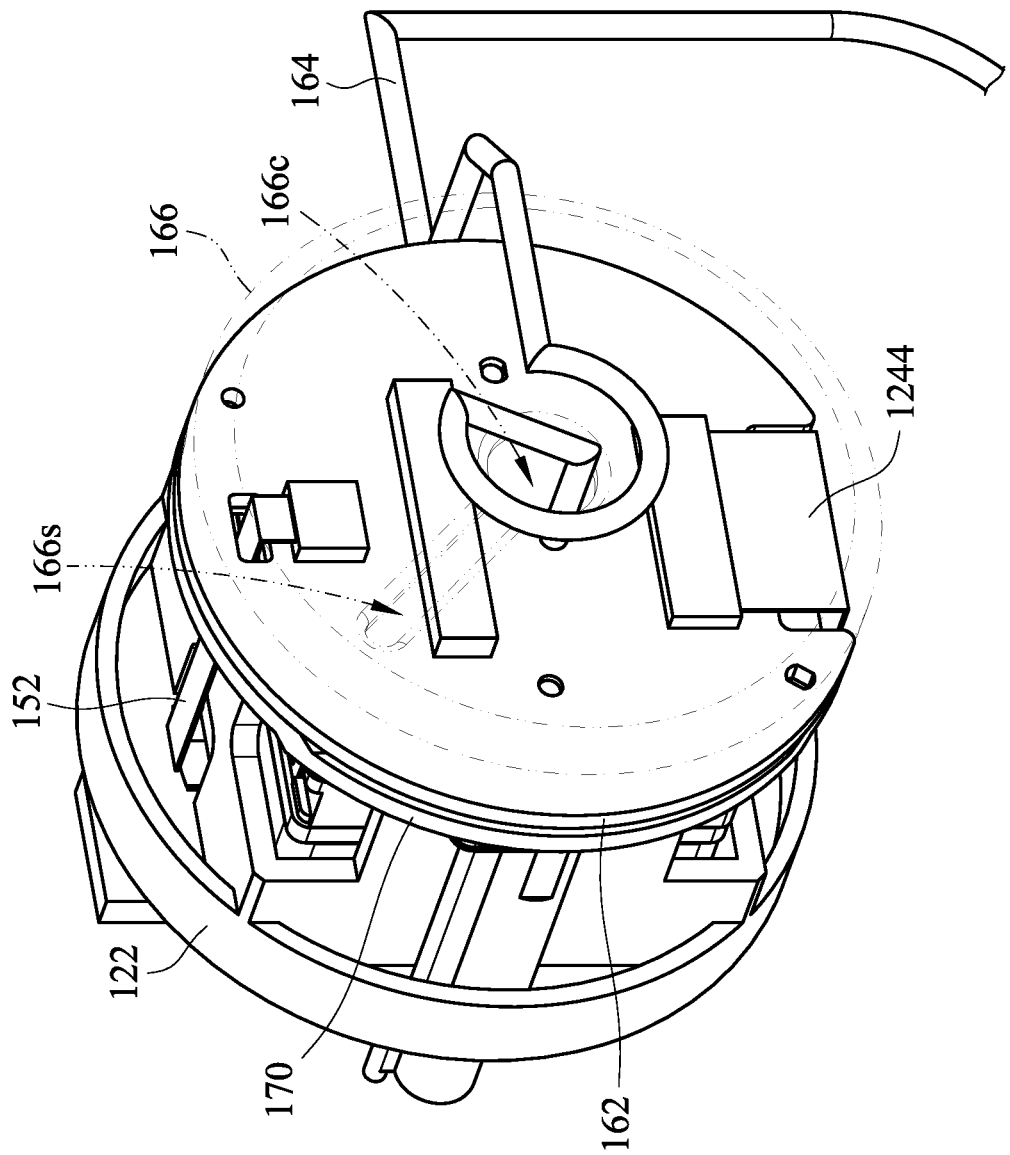
FIG. 4 is a perspective view of a portion of an image capture device at another viewing angle according to an embodiment of the present invention.

FIG. 1 is a perspective view of an image capture device according to an embodiment of the present invention. FIG. 2 is an exploded perspective view of an image capture device according to an embodiment of the present invention. FIG. 3 is a perspective view of a portion of an image capture device at a viewing angle according to an embodiment of the present invention. FIG. 4 is a perspective view of a portion of an image capture device at another viewing angle according to an embodiment of the present invention. Referring to FIGS. 1 to 4, the image capture device includes a casing 110, a camera module 120, a rotatable member 130 and a pan-tilt module 140.

As shown in FIGS. 1 and 2, the casing 110 includes a front casing 112 and a rear casing 114, and the front casing 112 has an opening region 112a.

As shown in FIG. 2, the camera module 120 is disposed in the casing 110. A portion of the camera module 120 is through the opening region 112a of the front casing 112. The camera module 120 includes a lens module bracket 122 and a lens module 124 disposed in the lens module bracket 122. In some embodiments, the lens module 124 is fixed in the lens module bracket 122. In some embodiments, a portion of the lens module bracket 122 and a portion of the lens module 124 are through the opening region 112a.

Please refer to FIG. 2, the rotatable member 130 is fixed on the lens module bracket 122. In some embodiments, the rotatable member 130 is fixed on the lens module bracket 122 through screws (not shown), but the present invention is not limited thereto. The rotatable member 130 may be fixed on the lens module bracket 122 through another fixing method. The rotatable member 130 is configured to rotate the camera module 120 when the rotatable member 130 is rotated (e.g., by the user) relative to the casing 110, so that the lens module 124 can be switched between the horizontal shooting mode and the vertical shooting mode. In some embodiments, the rotatable member 130 has an opening 130a. In some embodiments, the rotatable member 130 has an abutting member (not shown) facing a first pair of protrusions or a second pair of protrusions (please refer to FIG. 2, not marked) of the front casing. When the user rotates the rotatable member 130, the abutting member can engage between the first pair of protrusions or between the second pair of protrusions, so that the rotatable member 130 is temporarily positioned at this position.

As shown in FIG. 2, the pan-tilt module 140 includes a motor bracket 142, a first motor 144 and a second motor 146. The first motor 144 is connected between one end of the motor bracket 142 and a sidewall of the casing 110 (e.g., a sidewall of the front casing 112), and the second motor 144 is connected to another end of the motor bracket 142. However, the present invention is not limited to the foregoing embodiments. In other embodiments, the first motor may be connected between one end of the motor bracket and a sidewall of the rear casing 114. In some embodiments, the first motor 144 is configured to tilt the camera module 120, and the second motor 146 is configured to pan the camera module 120. In some embodiments, as shown in FIG. 2, the pan-tilt module 140 further includes a counterweight 148 adjacent to an inner surface of the rear casing 114. In some embodiments, the counterweight 148 is disposed between the inner surface of the rear casing 114 and a wire support 166. In some embodiments, the counterweight 148 is configured to adjust a center of gravity of the image capture device, so that the center of gravity of the image capture device falls on a rotation axis, so that the first motor 142/second motor 144 can output power with less effort.

In some embodiments, as shown in FIGS. 2 to 4, the image capture device further includes a TOF module 150. The TOF module 150 includes a first flexible circuit board 152 and a TOF sensor 154. As shown in FIG. 3, a portion of the first flexible circuit board 152 is fixed on the lens module bracket 122, and another portion of the first flexible circuit board 152 is through the lens module bracket 122. The TOF sensor 154 is disposed on the portion of the first flexible circuit board 152. In some embodiments, the TOF sensor 154 includes a light emitter (not shown) and a light receiver (not shown). In some embodiments, the TOF sensor 154 further includes package structures of the light emitter and the light receiver. In some embodiments, as shown in FIGS. 1 and 2, the TOF module 150 further includes an optical filter 156 adjacent to the TOF sensor 154 and disposed in the opening 130a of the rotatable member 130. The optical filter 156 is configured to allow light in a specific wavelength range to pass through the optical filter 156 and then reach the light receiver of the TOF sensor 154.

Figure 5:
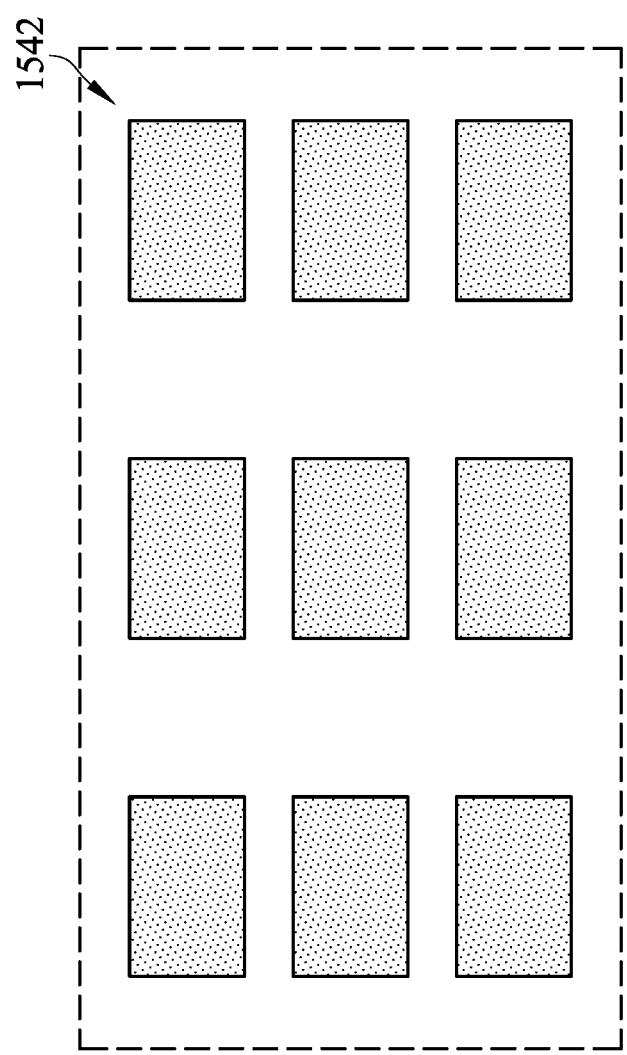
FIG. 5 is a top view of a sensing array of a time of flight (TOF) sensor according to an embodiment of the present invention.

FIG. 5 is a top view of a sensing array of a TOF sensor according to an embodiment of the present invention. In some embodiments, as shown in FIG. 5, the TOF sensor 154 has a sensing array 1542, which has a plurality of sensing points (not marked) arranged in an array. In some embodiments, the sensing array 1542 is disposed in a non-circular and non-regular polygonal region (corresponding to an imaging frame of the lens module 124), for example, in a rectangular region, but the invention is not limited thereto. When the rotatable member 130 is rotated, the camera module 120 and the TOF module 150 (including the sensing array 1542 of the TOF sensor 154) also rotate, so that a distribution region of the sensing array 1542 still corresponds to the imaging frame of the lens module 124.

In some embodiments, as shown in FIGS. 2 to 4, the image capture device further includes an adapter module 160. The adapter module 160 includes an adapter plate 162 and a wire 164. The adapter plate 162 is disposed in the casing 110 and is close to a back side of the lens module 124. In some embodiments, as shown in FIG. 4, the first flexible circuit board 152 of the TOF module 150 is connected to the adapter plate 162. In some embodiments, the first flexible circuit board 152 is connected to a back side of the adapter plate 162. In some embodiments, as shown in FIGS. 3 and 4, one end of the first flexible circuit board 152 is fixed on the lens module bracket 122, and the other end is fixed on the adapter plate 162. One end of the wire 164 is connected to the back side of the adapter plate 162. The first flexible circuit board 152 is electrically connected to the wire 164 through the adapter plate 162. In some embodiments, as shown in FIGS. 2 to 4, the lens module 124 further includes a second flexible circuit board 1244 connected to the adapter plate 162. In some embodiments, the second flexible printed circuit 1244 is connected to the back side of the adapter plate 162. The wire 164 is electrically connected to the second flexible circuit board 1244 through the adapter plate 162. In some embodiments, the image capture device further includes a main board (not shown), and the other end of the wire 164 is connected to the main board; in other words, the wire 164 is electrically connected between the adapter plate 162 and the main board. As such, the distance data of the subject sensed by the TOF sensor 154 of the TOF module 150 can be transmitted to a processor (e.g., a SOC processor) of the main board through the first flexible circuit board 152, the adapter plate 162 and the wire 164 sequentially to perform calculations, and calculated signals are transmitted to the second flexible circuit board 1244 through the wire 164 and the adapter plate 162 sequentially to control the lens module 124 to perform fast focusing.

In some embodiments, as shown in FIGS. 2 to 4, the adapter module 160 further includes a wire support 166 adjacent to the back side of the adapter plate 162. As shown in FIG. 4, the wire support 166 has a central opening 166c through which the wire 164 passes. When the rotatable member 130 is rotated, the adapter plate 162 and the wire 164 fixed on the back side thereof rotate. In some embodiments, the wire support 166 is configured to prevent the wire 164 from being caught in a nearby groove or being pulled when the wire 164 is rotated.

In some embodiments, as shown in FIG. 4, the wire support 166 further has a strip-shaped opening 166s connected to the central opening 166c. In some embodiments, when it is necessary to keep the wire support 166 away from the adapter plate 162 (e.g., when reworking or performing repairs), an operator can rotate the wire support 166, so that a portion of the wire 166s close to the wire support 166 is coincident or substantially coincident with the strip-shaped opening 166s, so that the operator can easily lift the wire support 166 away from the adapter plate 162.

In some embodiments, as shown in FIG. 2, the image capture device further includes a heat sink 170 disposed between the second flexible circuit board 1244 and the adapter plate 162. The heat sink 170 is configured to help heat dissipation of nearby components, so as to facilitate a long-term operation of the image capture device.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. An image capture device, comprising:
    a casing, comprising a front casing and a rear casing, and the front casing having an opening region;
    a camera module, disposed in the casing, wherein a portion of the camera module is through the opening region of the front casing, and the camera module comprises a lens module bracket and a lens module disposed in the lens module bracket;
    a rotatable member, fixed on the lens module bracket, wherein the rotatable member is configured to rotate the camera module when the rotatable member is rotated relative to the casing, so that the lens module is switched between a horizontal shooting mode and a vertical shooting mode; and
    a pan-tilt module, comprising a motor bracket, a first motor and a second motor, wherein the first motor is connected between one end of the motor bracket and a side wall of the casing, and the second motor is connected to another end of the motor bracket.

2. The image capture device of claim 1, wherein the pan-tilt module further comprises:
    a counterweight, adjacent to an inner surface of the rear casing.

3. The image capture device of claim 1, further comprising a time of flight (TOF) module, comprising:
    a first flexible circuit board, wherein a portion of the first flexible circuit board is fixed on the lens module bracket, and another portion of the first flexible circuit board is through the lens module bracket; and
    a TOF sensor, disposed on the portion of the first flexible circuit board.

4. The image capture device of claim 3, wherein the TOF module further comprises:
    an optical filter, adjacent to the TOF sensor, wherein the rotatable member has an opening, and the optical filter is disposed in the opening.

5. The image capture device of claim 3, wherein the TOF sensor has a sensing array disposed in a non-circular and non-regular polygonal region.

6. The image capture device of claim 3, further comprising an adapter module, comprising:
    an adapter plate, disposed in the casing and close to a back side of the lens module, wherein the first flexible circuit board is connected to the adapter plate; and
    a wire, wherein one end of the wire is connected to a back side of the adapter plate, and the first flexible circuit board is electrically connected to the wire through the adapter plate.

7. The image capture device of claim 6, wherein the lens module further comprises:
    a second flexible circuit board, connected to the adapter plate, wherein the wire is electrically connected to the second flexible circuit board through the adapter plate.

8. The image capture device of claim 7, further comprising:
    a heat sink, disposed between the second flexible circuit board and the adapter plate.

9. The image capture device of claim 6, wherein the adapter module further comprises:
    a wire support, adjacent to the back side of the adapter plate, and the wire support having a central opening, wherein the wire is through the central opening.

10. The image capture device of claim 9, wherein the wire support further has a strip-shaped opening connected to the central opening.

* * * * *